Figure 1:
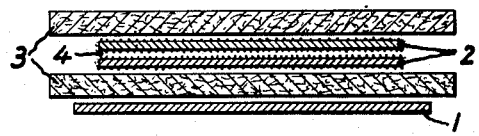

United States Patent Office 3,263,137
Patented July 26, 1966

3,263,137
ELECTROLYTIC CAPACITOR HAVING FILMED-ELECTRODE OF SPACED LAYERS
Heinrich Naumann and Fritz Müller, Berlin-Wilmersdorf, Germany, assignors to Hydrawerk Aktiengesellschaft, Berlin, Germany
Filed Nov. 15, 1961, Ser. No. 152,525
Claims priority, application Germany, Nov. 17, 1960, H 40,970; Nov. 30, 1960, H 36,760
10 Claims. (Cl. 317—230)

The present invention relates to capacitors.

More particularly, the present invention relates to low-loss electrolytic cells having a high capacitance-to-volume ratio, and to the use of such cells as electrolytic capacitors.

It has been sought, for many years, to reduce the over-all size of electrical components. To this end, electrolytic devices as, for example, electrolytic capacitors, have been made with anodes having enlarged active surface areas. These anodes are constituted by a metal base, provided with a metal oxide layer, which may, for instance, be formed on the base by an electrolytic process, which metal oxide layer acts as a valve in the sense that it will allow the flow of current in but one direction. (The metal of the oxide may but need not be the same as that of the base.) Such anodes will, therefore, be hereinafter referred to as valve metal anodes. This surface area increase can be brought about by appropriate electrode construction, as well as by appropriate treating processes, such as mechanical, chemical, or electro-chemical treatments. Of these, etching processes have been the most commonly used.

It has been found that the use of a roughened current lead-in electrode, i.e., an electrode of enlarged surface area, made of valve metal (generally, though not fully accurately, known as a cathode) brings about substantial advantages. For one thing, capacitors incorporating roughened current lead-in electrodes have a more stable capacitance under heavy load conditions, due to the fact that the current is distributed over a large surface area so that the specific load per unit area is reduced. For another, by enlarging the surface area of the current lead-in electrode and thus obtaining reduced specific current load, the formation, or, more accurately, the thickening of an already existing natural oxide layer, and consequently the capacitance-reducing effect of this series capacitance on the effective capacitor capacitance, can be substantially reduced, or be maintained small. The increased surface area is of particular significance in so-called low-voltage electrolytic capacitors.

It is unfortunately true that, while increasing the surface area of the electrode will increase the capacitance by a corresponding amount (assuming the volume to be the same), such a capacitor will also suffer higher losses, and it is precisely this which has long been a trouble spot in the art. While in many cases electrical losses can be converted into heat and, as such, be put to use, the heat produced in capacitors is, with but few exceptions, a definite disadvantage which sooner or later leads to damage and ultimate destruction of the capacitor. The problem, theerfore, is still to maintain these losses as small as possible.

It is true that if the surface area is increased by means of a special anode configuration (starshaped column; superposed, stacked, zig-zag folded, or more or less cylindrically or spirally wound layers or strips), the sought-after increase in capacitance can be obtained, but the limit is reached as soon as the losses and therefore the heat become excessive. The only remaining possibility, then, for increasing the capacitance without increasing the over-all volume was thought to be to increase the extent to which the electrodes, or their surfaces, were roughened. This was done, on the one hand, by roughening as much as possible the more or less smooth surfaces, while keeping in mind the characteristics of the material and the mechanical strength which would remain after the roughening process, and, on the other hand, by spraying or dusting individual metal particles onto a coarse grain web or grid and thereafter fusing the parts together in order to form a coherent electrode. It is also known to press together the metal particles in the form of metallic dust or powder and to sinter them together at an appropriate high temperature. For purely mechanical considerations, however, certain limits could no longer be exceeded, so that the art has developed in the direction of increasingly thinner dielectric layers, the necessary dielectric strength being obtained by using appropriate materials and/or appropriately treating the starting materials.

In contradistinction thereto, the present invention is based on the concept that the capacitance is increased by increasing the surface area, and attention has been given to the problem of why the more obvious solution, namely, using multiple-layer electrode foils or strips, either folded or stacked, was considered undesirable in the case of capacitors, particularly electrolytic capacitors, and it was noted that the electrical losses arising during operation of an electrolytic capacitor are determined by the resistance through which the current must flow from the terminal of one potential to the terminal of the other potential, for example, between two anodes or between an anode and the current lead-in electrode for the electrolyte constituting the cathode. If the current flow in the actual dielectric, i.e., the oxide layers of the anode, is considered as being negligible, then all that remains is the current flow through the electrolyte, or through the spacer soaked with electrolyte.

The question of whether an increase in the surface area of the electrode is accompanied by an increase in the conductor cross section of the current entering or leaving the dielectric layer, need not be considered. Since, however, the increase in length of the current path in the electrolyte, which increase is related to the enlargement of the cross section at the surface of the dielectric layer, is far more important, there is practically no decrease but rather an increase in the resistance and consequently in the electrical losses. Besides the very limited possibility of reducing the conductor resistance in the electrolyte by using an electrolyte of increased electric conductivity, the electrical losses in the electrolyte, or in the electrolyte-permeated spacers between the electrodes, as the case may be, are determined primarily by the length of the path which the current flowing through the electrolyte travels. This point of view has previously not been taken into consideration, or not sufficiently so, so that the mere doubling or multiplying of the anode foil layers or winding, without at the same time taking into consideration the fact that the current paths from one electrode to the other thus became longer, has always led to high energy losses, i.e., in heat due to such energy losses.

It is, therefore, the basic object of the present invention to provide an electrolytic capacitor having as small a volume-to-capacitance ratio as possible, in which capacitor the electric losses will be as low as possible, i.e., a capacitor which is accommodated in as small a volume as possible and simultaneously generates as little heat as possible. If the capacitance of the capacitor is to be increased by means of multiple-layer stacked and wound anode foils, i.e., if the capacitance is to be increased without using any intermediate connection of the counter electrode, the current paths must be as small as has been found to be acceptable in the case of but a single electrode pair. From a practical point of view, this means that the current flowing through the electrolyte must reach the counter electrode via the shortest path, i.e., it should not first penetrate the space between the electrodes while flowing around the adjacent foil in order to reach the rearward foil of that electrode; instead, the current should penetrate more or less rectilinearly to the nearest layer. In other words, the individual layers of at least that electrode which is covered with the dielectric material (the anode) has to be permeable insofar as the operating electrolyte is concerned. The permeability can be obtained in various ways by more or less well known processes, it being presupposed, however, that the multiple-layer characteristics, which are necessary to produce the sought-after increased surface area, is obtained and maintained in the course of the treatment.

In the manufacture of etched valve metal foils, these foils have sometimes been completely etched through so as to increase the surface area by as much as possible, i.e., the foils are rendered completely permeable to liquids and gases. By making use of this property it is possible, according to the present invention, to eliminate the major part of the spacer and electrolyte materials for a given capacitor type; in the case of polarized electrolytic capacitors, the current lead-in foils are also eliminated. In this way, the size of a capacitor of given capacitance is substantially reduced. The electrolytic capacitor according to the present invention has one or more multiple-layer anodes provided with one or more connecting lugs, i.e., electrodes of this type are made up of two or more anode foils which are superposed upon each other and are together rolled up or stacked, these foils being etched to such an extent as to be permeable to liquids and to remain permeable after the dielectrically stressable oxide films or layers, which can be obtained, for instance, by appropriately forming the surfaces, have been made. Inasmuch as the manner in which the contacts are formed and the manner in which the electrodes are formed are not part of the present invention, it is believed that it is sufficient to refer a person skilled in the art to existing etching and the like techniques.

If anode foils of different polarity or current lead-in electrodes which are at the potential of the electrolyte are to be included in the roll or stack, they will be supplied from one side with electrolyte liquid, either before manufacture or during manufacture via the porous spacer layers or foils which are wound in the roll or are part of the stack. It has been found, however, that, particularly in the case where the capacitor is subjected to a heavy thermal load, a certain electrolyte weakening will occur at the interior of the directly superposed anode foils; this can lead, under very adverse conditions, to a complete interruption of the electrolyte flow through the foils and thus produce a large drop in the capacitance. In order to avoid this, the instant invention provides porous layers between individual anode foils of the same potential, which porous layers serve as an electrolyte storage means and supply. These porous layers can be constituted by absorbent relatively thin paper layers or sheets and/or by protective layers made of amorphous surface coatings of the type known for use with dielectrics, as, for example, special oxide films of the anode foils. In this way, an electrolytic capacitor is obtained which has the same qualitative characteristics as heretofore known capacitors but which occupies substantially less volume.

By using as the current lead-in electrode an electrode made up of individual liquid-permeable foils, the resistance to switching transients of heavily loaded capacitors can be improved to such an extent that there is practically no capacitance drop even if the switching occurs very frequently. Moreover, it is possible in this way, particularly in the case of low-voltage electrolytic capacitors, further to increase the capacitance-to-volume ratio because by connecting a number of individual "cathode" foils in parallel the undesired "cathode" capacitance becomes correspondingly less.

Figure 2:
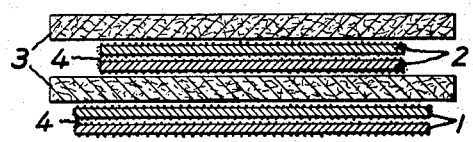
Figure 3:
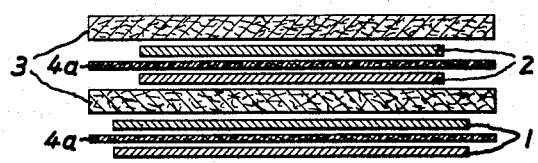

Additional objects and advantages of the present invention will become apparent upon consideration of the following description when taken in conjunction with the accompanying drawings in which:

FIGURES 1 to 3 are diagrammatic sectional views of three embodiments of a capacitor according to the present invention.

Referring now to the drawings, each of FIGURES 1 to 3 depicts one layer or turn, hereinafter referred to as one lamination, of an electrolytic capacitor according to the present invention. The non-formed or current lead-in electrode 1 which carries no metal oxide layer is shown, in FIGURE 1, as being constituted by but a single electrode element, whereas the embodiments of FIGURES 2 and 3 show this electrode as being a composite one made up of a plurality of electrode elements which are connected in parallel. The composite electrode elements may, if desired, have artificially enlarged surface areas; for instance, they can be made so as to be completely permeable to the electrolyte.

The anode electrode 2 is, according to the present invention, a composite electrode comprising a plurality of superposed individual electrode elements; these elements as well as the elements which make up the cathode electrode 1 in the case of a multiple-element cathode, are of matched surface configuration, the arrangement being such that the dielectric of the anode, namely, the metal oxide film, is adequately covered with the electrolyte when the capacitor is in assembled or operating condition. The dielectric, which instead of anode oxidation can also be produced by formation of the surface, is insulated, in both directions, from the cathode electrode 1 by a spacer 3 made of absorbent material, as, for example paper. This spacer serves as a storage means for the electrolyte.

In the case wherein the individual electrode elements of the composite electrodes are directly superposed on each other and are so stacked or coiled, they are separated from each other by means of adherent porous coatings 4 (FIGURES 1 and 2) or by intermediate layers 4a made of absorbent material (FIGURE 3).

Each lamination of each of the embodiments starts with the current lead-in electrode 1. Next comes a spacer 3 and finally the counter electrode 2. If there are to be a plurality of laminations, a second spacer 3 has to be provided in the stack or roll. Of course, each lamination can start with the spacer or with the partition 4, coating (FIGURES 1 and 2) or with the partition layer 4a (FIGURE 3) in which the latter case the second electrode element of the composite multiple-element electrode will not be placed next to the first electrode of such multiple-element electrode until the next lamination is placed into position, either by stacking or rolling. The important feature according to the present invention is that the two or more electrolyte-permeable electrode elements which are connected in parallel with each other, or which, in the finished capacitor, are to be connected in parallel, will be directly superposed upon each other.

While in the drawing the electrode elements 1 are shown as being wider than the electrode elements 2, it will be understood that they can be the same width, or narrower. Furthermore, instead of one anode foil for electrode 2 there can be a plurality of such foils which are placed in one lamination, in which case the current lead-in electrode can be either retained or eliminated.

It will be understood that the above description of the present invention is susceptable to various modifications, changes, and adaptations, and the same are intended to be comprehended within the meaning and range of equivalents of the appended claims. For instance, the electrode elements, which are stacked one above the other, can be sintered plates. The active surface areas, both of the electrodes 1 and 2, can be artificially enlarged mechanically, chemically, or electrochemically, such as by roughening, by stamping, by etching the surfaces either partly or completely through, and so on.

What has been described above is a capacitor which is made up mainly of foils, because it is this type of capacitor which today is generally used the most. This, however, does not preclude the application of the present invention to differently formed electrodes of more or less well known types, such as electrodes constituted by layers or belts produced by spraying, dusting, or the like, or electrodes forming more or less rigid bodies and produced by pressing and sintering, as stated above.

The following is an actual example of a low-loss electrolytic capacitor having a high capacitance-to-volume ratio, and built in accordance with the present invention, with reference mainly to FIGURE 3.

A coiled non-formed aluminum foil 1 of approximately $100\mu$ ($1\mu = 10^{-3}$ mm.) and having either plane or rough surfaces serves as the outermost turn. The composition multiple element electrode 2 consists of two elements of aluminum foil each of approximately $100\mu$, which electrode is permeable to the electrolyte (for instance, completely etched through) and coated with dielectrically stressable oxide films, for instance by forming alumina on the surface. The electrode 2 may have a configuration of two separate superposed foils or may consist of but one foil bent about a fold line with about one half pressed into superposition relative to the other. Well absorbing layers of paper of approximately $100\mu$ are put between the metal foils as electrolyte storage. The paper layer 4a of approximately $50\mu$ between the equipolar metal foils 2 serves exclusively as electrolytic storage. The paper layers 3 between the counterpolar metal foils 1 and 2 serve as isolating spacers because of the dielectric strength required. The thickness of the metal foils 1 and 2 and of the paper layer 4a depends mainly on the desired mechanical strength, while the thickness of the paper layers 3 depends on the desired dielectric strength.

What is claimed is:

1. A low-loss electrolytic capacitor having a high capacitance-to-volume ratio, said capacitor including at least two porous electrodes and a mass of electrolyte, at least one of said electrodes being coated, at those places where it comes into contact with the electrolyte, with a metal oxide film which constitutes a dielectric and which renders said one of said electrodes a valve metal electrode, said one electrode being a composite electrode comprising: a plurality of superposed individual electrode strips of matched surface configuration whose active surface areas are artificially enlarged to a liquid-permeable condition; and a porous layer interposed between each adjacent pair of said strips for causing dielectric to be completely covered with the electrolyte.

2. An arrangement as defined in claim 1 wherein said porous layer is constituted by a layer of amorphous material.

3. An arrangement as defined in claim 1 wherein said porous layer is constituted by a strip of absorbent paper which extends laterally beyond the edges of its associated strips.

4. An arrangement as defined in claim 1 wherein the other one of said two porous electrodes is constituted by an uncoated electrode.

5. An arrangement as defined in claim 4 wherein said uncoated electrode is a composite electrode comprising: a plurality of superposed individual liquid permeable-electrode strips of matched surface configuration; and a porous layer interposed between each adjacent pair of said strips.

6. A low-loss electrolytic capacitor having a high capacitance-to-volume ratio, said capactior including at least two porous electrodes and a mass of electrolyte, at least one of said electrodes being coated, at those places where it comes into contact with the electrolyte with a metal oxide film which constitutes a dielectric and which renders said one of said electrodes a valve metal electrode, said one electrode being a composite electrode comprising: a plurality of superposed individual electrode strips of matched surface configuration whose active surface areas are artificially enlarged to a liquid-permeable condition; and a porous layer interposed between each adjacent pair of said strips for causing said dielectric to be completely covered with the electrolyte.

7. An arrangement as defined in claim 6 wherein said porous layer is constituted by a coating of amorphous material.

8. An arrangement as defined in claim 6 wherein said porous layer is constituted by a sheet of absorbent paper which extends laterally beyond the edges of its associated plates.

9. An arrangement as defined in claim 6 wherein the other one of said two porous electrodes is constituted by at least one uncoated electrode.

10. An arrangement as defined in claim 9 wherein said uncoated electrode is a composite electrode comprising a plurality of superposed individual liquid-permeable electrode strips of matched surface configuration.

References Cited by the Examiner

UNITED STATES PATENTS

| 2,055,216 | 9/1936 | Edelman | 317—230 |
|---|---|---|---|
| 2,120,426 | 6/1938 | Herrmann | 317—230 |
| 2,278,161 | 3/1942 | Brennan | 317—230 |
| 2,297,607 | 9/1942 | Blackburn | 317—230 |
| 2,297,608 | 9/1942 | Blackburn | 317—230 |
| 2,578,667 | 12/1951 | Brennan | 317—230 |
| 2,582,744 | 1/1952 | Brennan | 317—230 |
| 2,616,165 | 11/1952 | Brennan | 317—230 |
| 2,755,418 | 6/1956 | Brennan | 317—230 |
| 2,917,683 | 12/1959 | Brennan | 317—230 |

FOREIGN PATENTS

| 627,333 | 8/1949 | Great Britain. |
|---|---|---|
| 747,051 | 3/1956 | Great Britain. |

JOHN W. HUCKERT, *Primary Examiner.*

JAMES D. KALLAM, *Examiner.*